G. W. N. YOST.
Car Wheel.

No. 93,386.

Patented Aug. 3, 1869.

Witnesses.

Inventor.

UNITED STATES PATENT OFFICE.

G. W. N. YOST, OF CORRY, PENNSYLVANIA.

IMPROVED RAILROAD-CAR WHEEL.

Specification forming part of Letters Patent No. 93,386, dated August 3, 1869.

*To all whom it may concern:*

Be it known that I, GEORGE W. N. YOST, of Corry, Pennsylvania, have invented an Improved Elastic Car-Wheel for Railway Cars or Carriages, of which the following is a specification.

The nature of my invention consists in constructing a car-wheel, composed of a main wheel, elastic felly, tire, and fastening-plate, in such a way that the elastic felly easily, readily, and forcibly may be compressed laterally and expanded radially by means of a circular, oval, or diamonded groove between the main wheel and tire, the adaptation of the elastic felly to fit that groove, and a wedge-like form of fastening-plate.

The following description and accompanying drawings, of both which the specifying-letters refer to the same parts, fully illustrate the invention, and of which drawings—

Figure 1:
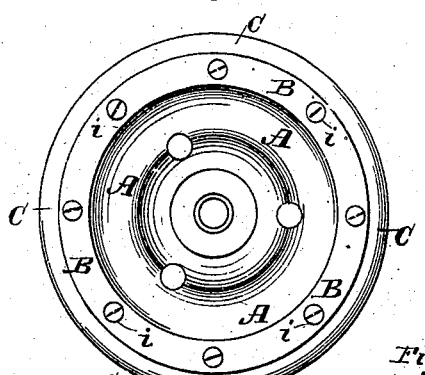
Figure 2:
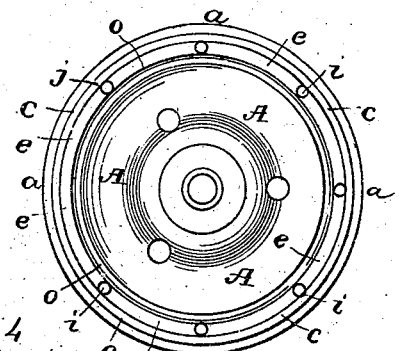
Figures 3, 4, 5, 7:
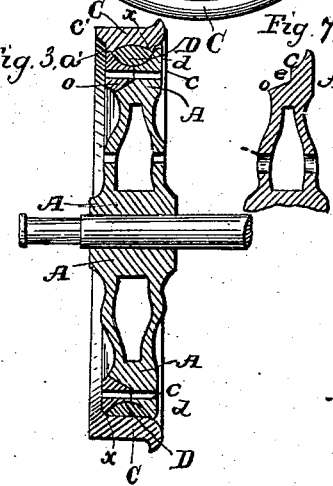
Figure 6:
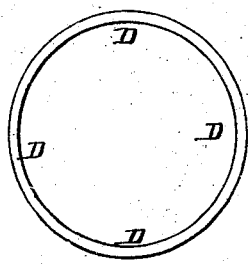

Figure 1 is a side view of the whole wheel with all the parts combined. Fig. 2 is a side view of the main wheel without the other parts. Fig. 3 is a sectional view of the wheel with all the parts combined. Fig. 4 is a sectional view of the main tire and felly or inner tire combined. Fig. 5 is a sectional view of the fastening annular disk. Fig. 6 is a side view of the elastic felly or inner tire, and Fig. 7 is a sectional view of the periphery of the main wheel.

A is a main wheel, of cast-iron or other material, of any desired style, about five inches wide or thick laterally, and four inches less in diameter than the desired size of a railway-car wheel.

$a$ is a flange, about an inch wide radially and three-fourths of an inch thick laterally, projecting from one side edge of the main wheel A.

$c$ is a circular, oval, or diamonded groove from the inner corner of the flange $a$ to the middle of the edge of the main wheel A, and about an inch deep radially.

$e$ is a shoulder, about an inch wide radially toward the center of the main wheel A from the inner line or edge of the groove $c$.

$o$ is a bevel, from the inner corner of the shoulder $e$ to the side opposite to the flange $a$, of an angle to make the periphery of the main wheel A about two inches smaller at one side than in the middle, next to the shoulder.

B is an annular disk, in outer diameter the size of the larger diameter of the main wheel A, in inner diameter the size of the smaller diameter of the main wheel A, and about half as wide laterally as the periphery of the main wheel A.

$o'$ is a bevel on the inner periphery of the disk B, the counterpart of the bevel $o$ on the periphery of the main wheel A.

$c'$ is a circular, oval, or diamonded groove in the outer periphery of the disk B, similar to the groove $c$ in the periphery of the main wheel A.

$a'$ is a flange on the disk B, similar to the flange $a$ on the main wheel. The plate side of the disk B is fitted to the plane of a side of the main wheel A.

C is an outer or main tire, large enough to surround the main wheel A, and about six inches wide laterally and two inches thick radially, with a wearing surface and flange similar to the "tread" and "rail-flange" of a common railway-car wheel, made of "chilled" cast-iron, steel, or other material.

$x$ is a circular, oval, or diamonded groove in the inner periphery of the main tire C, about three inches wide laterally and half an inch deep radially.

$s$ and $s'$ are shoulders—one each side of the groove $x$—about three-fourths of an inch wide radially, made by the main tire being thinner between the groove and side edges than at the groove edges.

D is a flexible elastic ring or felly or inner tire, of leather, cotton, wool, caoutchouc, (india-rubber,) or other material, of a circular, oval, or diamonded stem or body, adapted to a curved or a diamonded groove or hollow, $c$ $c'$ $x$, combined of the grooves $c$, $c'$, and $x$ of the main wheel, disk, and main tire A, B, and C.

$i$ is a series of holes and bolts laterally through the combined main wheel and disk A B, about an inch in diameter, six to ten in number, and the bolts long enough to go through the main wheel and disk A and B, and receive heads and nuts and screws on the ends.

The parts are combined by putting the main wheel and disk A and B within the main tire C, with the flange $a$ facing the shoulder $s$, and the flange $a'$ facing the shoulder $s'$, and the felly or inner tire, D, within the groove or hollow $c$ $c'$ $x$, and are held and fastened together by the bolts and nuts and screws through the holes $i$.

The groove $x$ between the shoulders $s$ and $s'$ of the main tire C, being narrower than the groove $c\ c'$ of the combined main wheel and disk A B, will allow radial and lateral vibrations of the main tire.

The essential feature of my invention is the circular, oval, or diamonded form of the groove $c\ c'\ x$ and of the elastic felly D, the advantage being that a lateral pressure will expand radially such a form of elastic felly against every point of the groove $x$ more forcibly and thoroughly than it will any other form of elastic felly, which will allow the renewable tire C to be thinner and cheaper than any other way. Therefore, I limit myself thereto, and only claim—

1. The combination of a main wheel, disk, and main tire, A, B, and C, when made with a circular, oval, or diamonded groove, $c\ c'\ x$, between them, substantially as and for the purpose described.

2. The combination of an elastic felly, D, when made to fit the said groove $c\ c'\ x$, with the said wheel, disk, and tire A, B, and C, substantially as and for the purpose described.

GEORGE W. N. YOST.

Attest:
    FRANK H. W. GREGG,
    FRED G. CROSBY.